United States Patent
Sastry et al.

(10) Patent No.: US 11,334,592 B2
(45) Date of Patent: May 17, 2022

(54) SELF-ORCHESTRATED SYSTEM FOR EXTRACTION, ANALYSIS, AND PRESENTATION OF ENTITY DATA

(71) Applicant: Wheelhouse Interactive, LLC, Seattle, WA (US)

(72) Inventors: Aditya Sastry, Seattle, WA (US); Roy Hodges, Issaquah, WA (US); Dustin Moore, Edmonds, WA (US); Dallas Slaughter, Seattle, WA (US)

(73) Assignee: Wheelhouse Interactive, LLC, Seattle, WA (US)

( * ) Notice: Subject to any disclaimer, the term of this patent is extended or adjusted under 35 U.S.C. 154(b) by 357 days.

(21) Appl. No.: 16/653,138

(22) Filed: Oct. 15, 2019

(65) Prior Publication Data
US 2021/0109945 A1   Apr. 15, 2021

(51) Int. Cl.
  *G06F 16/25* (2019.01)
  *G06F 16/958* (2019.01)
  *G06F 40/205* (2020.01)
  *G06F 40/295* (2020.01)

(52) U.S. Cl.
  CPC .......... *G06F 16/254* (2019.01); *G06F 16/986* (2019.01); *G06F 40/205* (2020.01); *G06F 40/295* (2020.01)

(58) Field of Classification Search
  CPC .... G06F 16/254; G06F 16/986; G06F 40/205; G06F 40/295; G06F 16/951
  USPC ........................................................ 707/602
  See application file for complete search history.

(56) References Cited

U.S. PATENT DOCUMENTS

| | | | |
|---|---|---|---|
| 6,282,548 B1 | 8/2001 | Burner et al. | |
| 6,605,120 B1 | 8/2003 | Fields et al. | |
| 7,975,020 B1 | 7/2011 | Green et al. | |
| 10,430,111 B2 * | 10/2019 | Stevens | G06F 3/0652 |
| 2003/0025728 A1 | 2/2003 | Ebbo et al. | |
| 2004/0199606 A1 | 10/2004 | Brown et al. | |
| 2005/0004889 A1 | 1/2005 | Bailey et al. | |
| 2005/0120114 A1 | 6/2005 | Nadamoto et al. | |
| 2005/0262062 A1 | 11/2005 | Xia | |
| 2006/0184500 A1 | 8/2006 | Najork et al. | |
| 2009/0319342 A1 * | 12/2009 | Shilman | G06Q 30/02 705/7.41 |
| 2010/0268720 A1 | 10/2010 | Spivack et al. | |

(Continued)

*Primary Examiner* — Stephen S Hong
*Assistant Examiner* — Broderick C Anderson
(74) *Attorney, Agent, or Firm* — Rowan TELS LLC

(57) ABSTRACT

A method for operating a self-orchestrated system for extraction, analysis, and presentation of entity data involves extracting a web page to object-based storage including web page content, web page metadata and a globally unique identifier. The method extracts the web page metadata from the object-based storage. The method inputs the web page metadata to a queue. The method pulls web page content from a content store. The method receives RegEx from a model parameter store. The method parses the web page content using RegEx and web page metadata. The method passes web page metadata and extracted content from the web page and positions of extracted content to an advanced analysis function decider (AAF Decider) for analysis. The method streams web page metadata and extracted content from the web page and positions of the extracted content to a JSON file batch for flattening.

20 Claims, 14 Drawing Sheets

(56) References Cited

U.S. PATENT DOCUMENTS

2015/0106078 A1\* 4/2015 Chang .................... G06F 16/35
                                                    704/9
2017/0024436 A1\* 1/2017 Look .................... G06F 16/242
2018/0336279 A1\* 11/2018 Ahern ................ G06F 16/9535

\* cited by examiner

SELF-ORCHESTRATED SYSTEM FOR EXTRACTION, ANALYSIS, AND PRESENTATION OF ENTITY DATA

BACKGROUND

High throughput data acquisition and analysis is incredibly time consuming and resource intensive especially when data is being acquired from external sources. Information is difficult to find in view of the vast quantities and varieties available and may take more search time than a typical user is willing to spend. Search engines may be used, but may rely on filtered services, which may only allow them to select from a small subset of information sources.

Web pages may include a large amount of data, including web page content, other URLs, and web page metadata. The presentation of the data from webpages may pose additional challenges to users if the access to the data is restricted to a subset of users. Thus, there is a need for efficiently categorizing and collecting data from webpages and information sources and filtering this collected data for use by an end user.

BRIEF SUMMARY

A method for operating a self-orchestrated system for extraction, analysis, and presentation of entity data involves extracting a web page to object-based storage including web page content, web page metadata and a globally unique identifier. The method extracts the web page metadata from the object-based storage. The method inputs the web page metadata to a queue. The method pulls web page content from a content store. The method receives RegEx from a model parameter store. The method parses the web page content using RegEx and web page metadata. The method passes web page metadata and extracted content from the web page and positions of extracted content to an advanced analysis function decider (AAF Decider) for analysis. The method streams web page metadata and extracted content from the web page and positions of the extracted content to a JSON file batch for flattening.

A non-transitory computer-readable storage medium, the computer-readable storage medium including instructions that when executed by a computer, cause the computer to extract a web page to object-based storage including web page content, web page metadata and a globally unique identifier. The instructions may configure the computer to extract the web page metadata from the object-based storage. The instructions may configure the computer to input the web page metadata to a queue. The instructions may configure the computer to pull web page content from a content store. The instructions may configure the computer to receive RegEx from a model parameter store. The instructions may configure the computer to parse the web page content using RegEx and web page metadata. The instructions may configure the computer to pass web page metadata and extracted content from the web page and positions of extracted content to an advanced analysis function decider (AAF Decider) for analysis. The instructions may configure the computer to stream web page metadata and extracted content from the web page and positions of the extracted content to a JSON file batch for flattening.

A computing apparatus may comprise a processor and a memory storing instructions. When the instructions are executed by the processor the apparatus may be configured to extract a web page to object-based storage including web page content, web page metadata and a globally unique identifier. The instructions may configure the apparatus to extract the web page metadata from the object-based storage. The instructions may configure the apparatus to input the web page metadata to a queue. The instructions may configure the apparatus to pull web page content from a content store. The instructions may configure the apparatus to receive RegEx from a model parameter store. The instructions may configure the apparatus to parse the web page content using RegEx and web page metadata. The instructions may configure the apparatus to pass web page metadata and extracted content from the web page and positions of extracted content to an advanced analysis function decider (AAF Decider) for analysis. The instructions may configure the apparatus to stream web page metadata and extracted content from the web page and positions of the extracted content to a JSON file batch for flattening.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
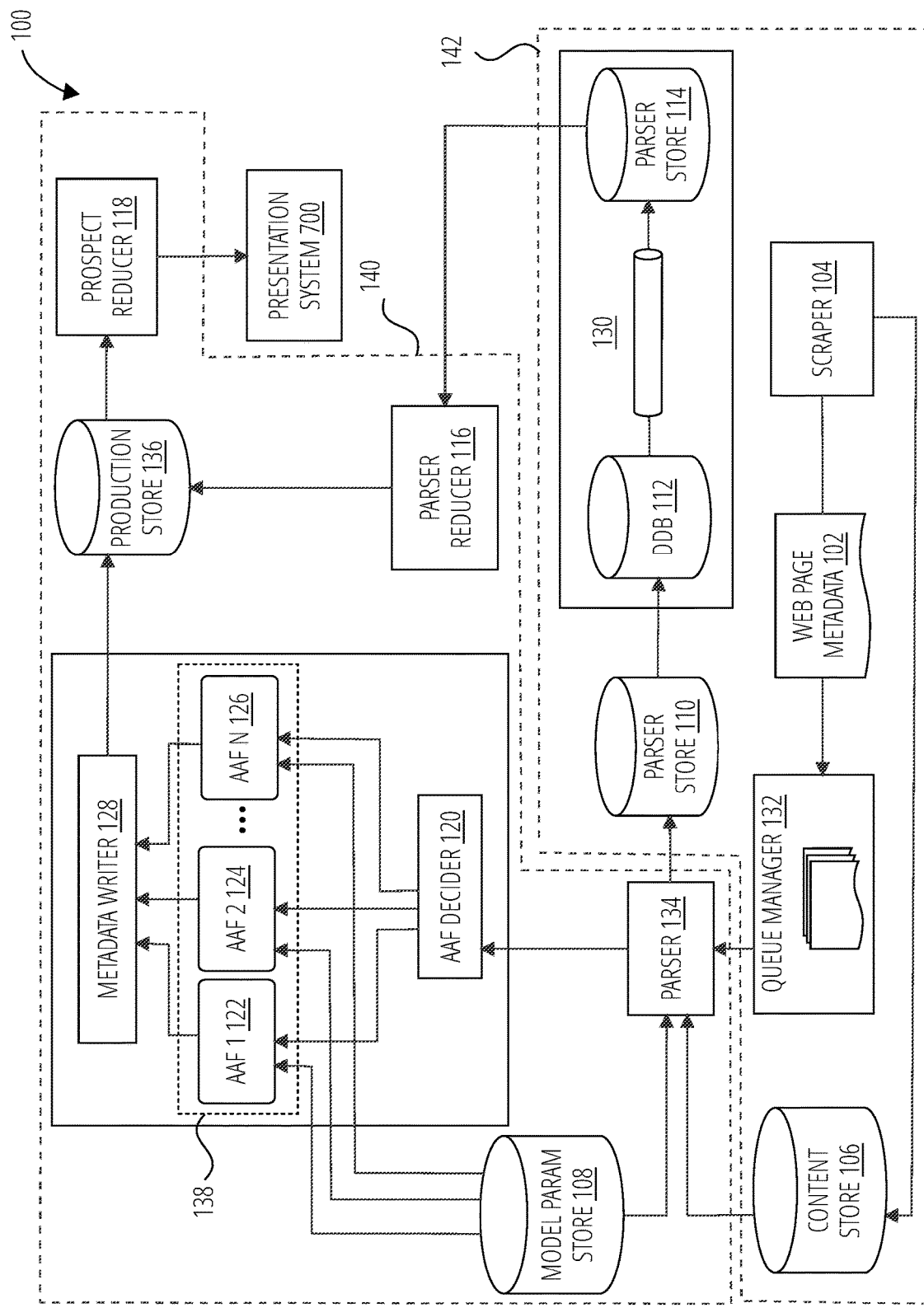
FIG. 1 illustrates a system 100 in accordance with one embodiment.

"AAF" refers to Advanced Analysis Function. Performs frequency analysis on terms and proximity analysis, for example. This may include at least one of a keyword at page location; proximity based on DOM; a distance to other terms is filter for relevance between terms; DOM levels and nature of edge (parent/child/neighbors) factor into distance/relevance; neighbors more relevant; term frequency Inverse Density Function; term frequency drives categorization of site; distance drives presentation/relevance; and language analysis is to identify vernacular/industry-specific terminology/dictionaries.

"Content store" refers to storage for content, which may include web page content and web page metadata. The storage may be a hard disk based block store.

"Data pipe" refers to a high-bandwidth pipe between services that pipes data at an extreme rate between two services. Examples may include a cloud computing service, such as Amazon Web Services S3 buckets, a distributed file storage, etc.

"DDB" refers to dynamic database

"Extracted content" refers to content that has been extracted from data, such as relevant content extracted from a web page.

"Flattening" refers to removing object or array wrappings in a JSON file that are not necessary for a particular task. For example, the JSON file may be flattened to remove duplicates.

"Globally unique identifier" refers to a 128-bit number created by the Windows operating system or another Windows application to uniquely identify specific components, hardware, software, files, user accounts, database entries and other items. A universally unique identifier (UUID) is also a 128-bit number used to identify information in computer systems.

"High availability content store" refers to AWS service/database.

"Model parameter" refers to parameters that drive analysis; potentially learned/adapted over time. Examples are key terms, RegEx, distance thresholds etc.

"Model parameter store" refers to a storage location that contains parameters used by other modules to perform their various functions such as a content extraction module, a learning algorithm, and advanced analysis functions. The parameters may vary depending on the type of data received by a module.

"Object-based storage" refers to an approach to addressing and manipulating data storage as discrete units (objects). Objects are kept inside a single repository, and are not nested as files inside a folder inside other folders.

"Parser" refers to keyword extraction system driven e.g., by RegEx.

"Parser reducer" refers to file/data flattener that also strips out redundant content.

"Positions of the extracted content" refers to Positions of extracted content in the data from which it was extracted. As an example, from an extracted web page, term positions would be the locations of those terms within the web page.

"Queue" refers to a list of data items, commands, etc., stored so as to be retrievable in a definite order.

"Queue manager" refers to "Queue manager"; puts things into the queue.

"RegEx" refers to regular expression, which is a sequence of characters that define a search pattern often used in search engines, search and replace dialogs of text editors, and in text processing utilities.

"Relevance between the terms" refers to Distance between terms on a web page, as determined by an AAF Decider.

"Scraper" refers to a tool used to fetch and extract data from web pages.

"Term frequency" refers to how many times a term appears in a particular set of data. For example, the number of times a particular word appears on a web page.

"Web page content" refers to the textual, visual, or aural content that is encountered as part of the user experience on a web page.

"Web page metadata" refers to data generated or inferred using a combination of AI, ML, statistical methodologies, or business rules to generate data describing, grouping, summarizing, or clustering data.

The disclosure is directed to a self-orchestrated, distributed system that performs crawling, extraction and analysis to collect entity data from disparate sources, then combine, filter, score and organize for presentation. The system utilizes real-time event-based learning combined with other discovered entity attributes to assign a machine-learning driven score that predicts the propensity of a given entity to be in the market for a product or service.

The data systems' architecture may allow for data integrity, platform stability, and end-to-end multi tenancy. By separating concerns between each layer and sub-unit of the system and adding intermediary data storage, the system may remain fast while gaining a significantly higher degree of fault tolerance, stability, and scalability (vertical & horizontal). A further benefit of this process is that it allows for a modular system design that can accommodate a range of use cases to match the needs of end users without requiring significant architecture changes or development time.

The system may include one or more of the following elements:
Crawling
Automated data discovery
Self-orchestrated, distributed crawling extraction and analysis.
Intelligent data extraction
Scoring
Machine Learning
Simplified Presentation
Big data Reduction (hunters)
Modular analysis system
Modular data aggregation
Asynchronous scoring processes
data filtering and presentation
Learning filter system
Natural language processing
Natural language search
Real-time event-based learning (news feed listening)
GIS based learning (geographic data)

A method for operating a self-orchestrated system for extraction, analysis, and presentation of entity data involves extracting a web page to object-based storage including web page content, web page metadata and a globally unique identifier. The method extracts the web page metadata from the object-based storage. The method inputs the web page metadata to a queue. The method pulls web page content from a content store. The method receives RegEx from a model parameter store. The method parses the web page content using RegEx and web page metadata. The method passes web page metadata and extracted content from the web page and positions of extracted content to an advanced analysis function decider (AAF Decider) for analysis. The method streams web page metadata and extracted content from the web page and positions of the extracted content to a JSON file batch for flattening.

In some configurations, the AAF Decider includes logic to determine presence of a term at web page location. The AAF Decider may determine proximity of terms based on the DOM. The AAF Decider may determine distance between terms in order to filter for relevance between terms. The AAF Decider may apply DOM levels and nature of edge (parent/child/neighbors) factor into distance/relevance determinations. The AAF Decider may apply a term frequency Inverse Density Function. The AAF Decider may apply term frequency to drives categorization of a web site and distance between the terms to drive presentation/relevance. The AAF Decider may perform language analysis to identify vernacular/industry-specific terminology/dictionaries.

In some configurations, the method may operate the AAF Decider to determine operative modules. The method may then activate a first module to determine term frequency on web page metadata and web page content. The method may then activate a second module in parallel with the first module to identify language used in the web page content. The method may then pass positions of terms and relevance between the terms to a JSON file for flattening.

In some configurations, the web page content is at least one PDF document from the web page.

In some configurations, the method may input a universal resource locator (URL) to a queue. The method may then invoke a scraper on the URL. The method may then scrape data from the URL to identify other URLs, web page content, and metadata. The method may then store data to the object-based storage in a content store, wherein the object-based storage include web page content, web page metadata and a globally unique identifier. The method may then store the web page metadata in a metadata store. Non-limiting examples of metadata include Standards Certifications (ISO, MILSPEC etc.), Business Processes, Contact Information, Industry Verticals, Product Groupings, etc.

In some configurations, the method may involve converting JSON files to SQL tables and SQL fields. The method may identify customer-relevant data from the SQL tables and the SQL fields using RegEx and customer attributes. The method may then apply the customer-relevant data to a presentation system.

FIG. 1 illustrates the architecture of a self-orchestrated system 100 for extraction, analysis, and presentation of entity data. The system 100 comprises a data reduction system 140, an aggregation system 142, and a presentation system 700. The aggregation system 142 comprises a scraper system 500, a queue manager 132, a content store 106, a parser store 110, and a high availability content store that communicates with a parser store 114 through a high throughput data pipe 130, which may be a queue.

The data reduction system 140 comprises a parser 134, a model parameter store 108, a parser reducer 116, a production store 136, a prospect reducer 118, an AAF decider 120, a plurality of operative modules 138 (AAF module 122, AAF module 124, and AAF module 126), and a metadata writer 128.

During operation of the system 100, the scraper system 500, communicates web page metadata 102 to the queue manager 132. The scraper system 500 communicates webpage content to the content store 106.

The parser 134 is configured with the web page metadata 102 from the queue manager 132 and the RegEx information from a model parameter store 108 to extract information from the webpage content stored in the content store 106. The extracted content, including the webpage metadata and the positions of the extracted content within the webpage, is then communicated to the AAF decider 120. The AAF decider 120 determines which of the operative modules 138 information may be sent to for further processing. The operative modules 138 may be configured with RegEx from the model parameter store 108 to further actions once activated. For instance, when activated, one of the operative modules 138 may determine term frequency on the webpage metadata and the webpage content, while another module may be activated to work in parallel to identify the language (vernacular) utilized in the web page content. The information extracted by the operative modules 138, such as the position and relevance of the identified terms, may then be passed on to the metadata writer 128. The metadata writer 128 may write the information to a JSON file which is then stored in the production store 136. The JSON file with the terms may be then go through another reduction process through a prospect reducer 118 that extracts information further before it is sent to the presentation system 700. During the process the parser 134 communicates the RegEx, the web page metadata 102, and the extracted information to a parser store 110 as parser information. The parser information from the current operation and various other operations, is then communicated to a dynamic database 112 communicates the information through a high throughput data pipe 130 to a parser store 114 which is then communicated to a parser reducer 116. The parser reducer 116 reduces the data further and stores the information in the production store to help improve future operations of the parser.

The operation of a self-orchestrated system 100 for extraction, analysis, and presentation of entity data begins with a web page or some content source, that is targeted for data extraction and processing for the purposes of presenting the extracted information to a group of end users.

The operation of the system 100 begins with the scraper system 500. The scraper system 500 extracts the entire web page and dumps it into a content store that may be accomplished by an object-based storage (e.g., an Amazon S3 bucket). The scraper system 500 populates the content store with different pages. The status information and the metadata information from each web page go into the queue manager, which basically populates batches of pages to process for through the parser. The system 100 utilizes the web page metadata to determine which pages are to be processed through the reduction system.

The metadata provides information identifying which webpages stored in the content store are to be processed. From the web page metadata the system may process about 50,000 pages at a time. This is done in asynchronous batches, that go into the queue manager before they are queued by the parser. The parser may function as a data extraction unit that is trained using regular expression to extract specific types of content from the pages in a distributed manner that may have about 1000 parallel invocations. The configuration of the parser allows for an extremely high throughput of data that enables the system to parse through, for example, one thousand of pages per second. The model parameters store stores the actual regular expression that are used to drive the parser. The parser is driven with both the RegExs and the metadata from the web page.

Once the parser extracts the information such as the target terms and their locations within the page, it passes the extracted content along with the metadata to the AAF (advance analysis function) decider. The parser also, also passes along the extracted information, the terms, and the location and position information of that term such as the line number in the code where the terms were found or the line or character position of the term on the site.

The AAF Decider performs a deeper analysis on the extracted information and determine which pages are considered high value and require additional extraction of information that is where any kind of deeper analysis is run on pages that are flagged to be of high value. The AAF Decider determines what analysis functions to apply for a particular page depending on a collection of factors. In an embodiment the client is first and foremost. The AAF Decider may be based on ML, AI, Statistical Analysis, or Business Rules that determine what analysis steps to run on a particular page. In exemplary embodiments, the AAF Decider is extensible.

The AAF Decider may be a rules driven engine that based on certain factors decides whether further analysis of a page is required. For example, the AAF Decider may run natural language processing analysis on term frequency and density to determine whether a given page is the home page of the website. If the decider determines that a given page is the homepage, it may pass that to the next function, which may run natural language processing on those given pages.

The AAF Decider functions mostly to determine which operative modules are to be activated in further processing of a web page determined to be of high value. For instance, the AAF Decider may activate a first module to determine term frequency on a particular high value page while also activating a second module in parallel to identify the language (vernacular). The extracted information is then passed on with the position of terms and relevance between the terms to a JSON file for flattening to remove duplicates. Each time the parser runs, it writes all of the data, such as the metadata and RegEx, as well as the identified terms, and the location of the identified terms within the web page and streams that information into flat JSON files that go in a data bucket. Each JSON file is batched processed around 10,000 pages, and invokes a control reducer once it is put into the data bucket. The control reducer is similar to a reducer function that takes the 10,000 distinct pages and checks it against what is present in the database to help limit duplicates of content that is stored in the production store. The system may also be configured to aggregate the data an reduce the reduplicates that are in the JSON file.

Figure 2:
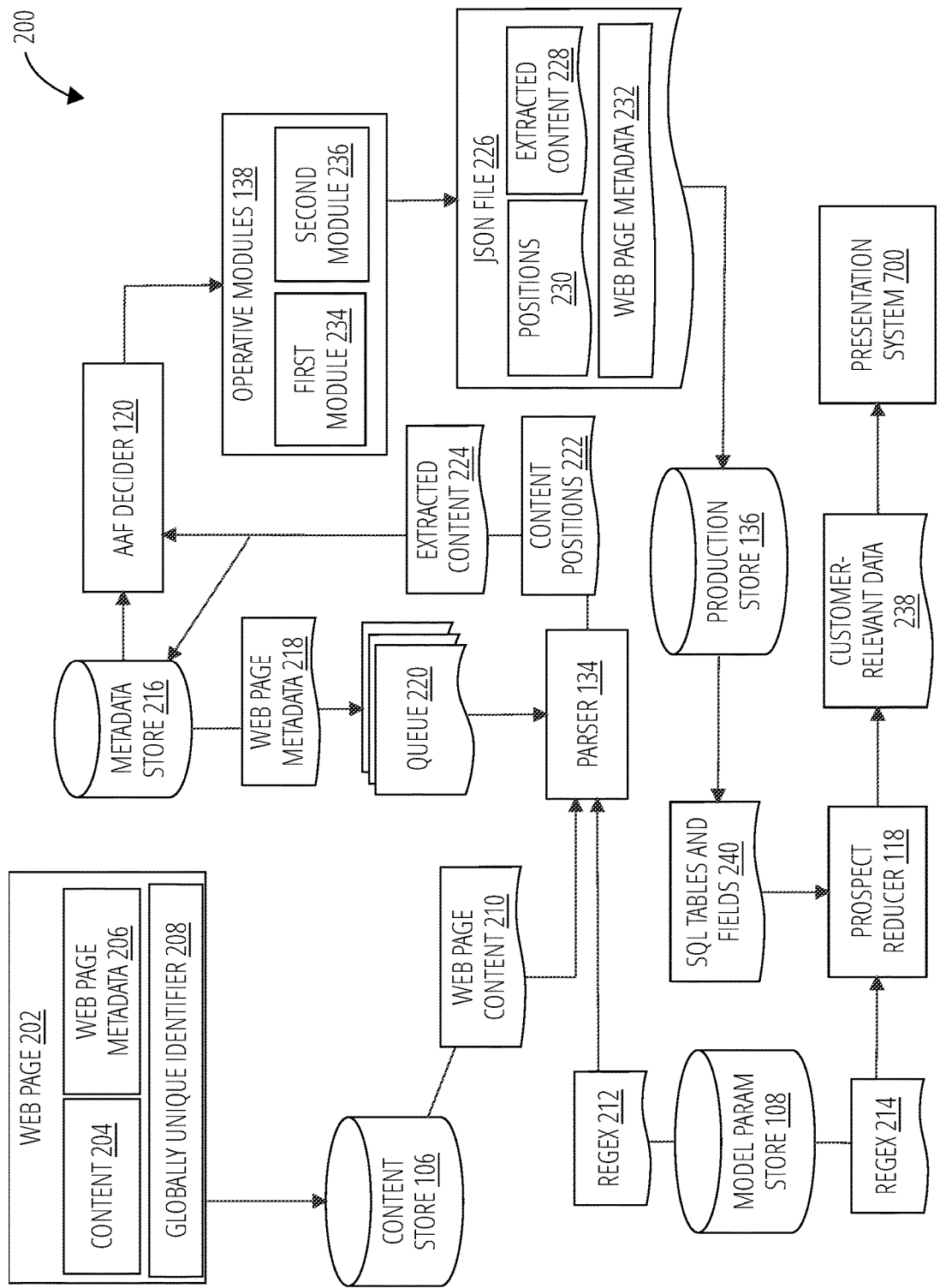
FIG. 2 illustrates a system 200 in accordance with one embodiment.

FIG. 2 illustrates the architecture of a self-orchestrated system 200 for extraction, analysis, and presentation of entity data. The system 200 comprises a web page 202, a content store 106, a queue 220, a parser 134, an AAF decider 120, operative modules 138, a model parameter store 108, a prospect reducer 118, a production store 136, and a presentation system 700. A web page 202 comprising web page content 204, web page metadata 206, and a globally unique identifier 208 is extracted through a scraper system 500 and stored in object-based storage within a content store 106. Web page metadata 218 from the metadata store 216 is added to a queue 220 for the parser 134.

The parser 134 is configured with the web page metadata 218 and RegEx 212 from the model parameter store 108 to parse web page content 210 from the content store 106. The parser 134 extracts positions of extracted content 222 and extracted content 224 from the web page content 210 and communicates the information to an AAF decider 120 and the metadata store 216. The AAF decider 120 performs additional analysis on the extracted content 228 and the positions of extracted content 222 to determine the which of the operative modules 138 (first module 234 and second module 236) to activate to perform further analysis on the materials. The metadata store 216 receives extracted content 224 and may send additionally found metadata to the AAF decider 120.

Once the operative modules 138 complete their operations, the extracted information is written to a JSON file 226 that includes term positions 230 within the webpage, the extracted content 228, and the web page metadata 232. The JSON file 226 is communicated to the production store 136 before it is converted into a SQL tables and fields 240. The SQL tables and fields 240 are then sent to a prospect reducer 118 configured by RegEx 214 to produce customer-relevant data 238 that is then sent to the presentation system 700.

Figure 3:
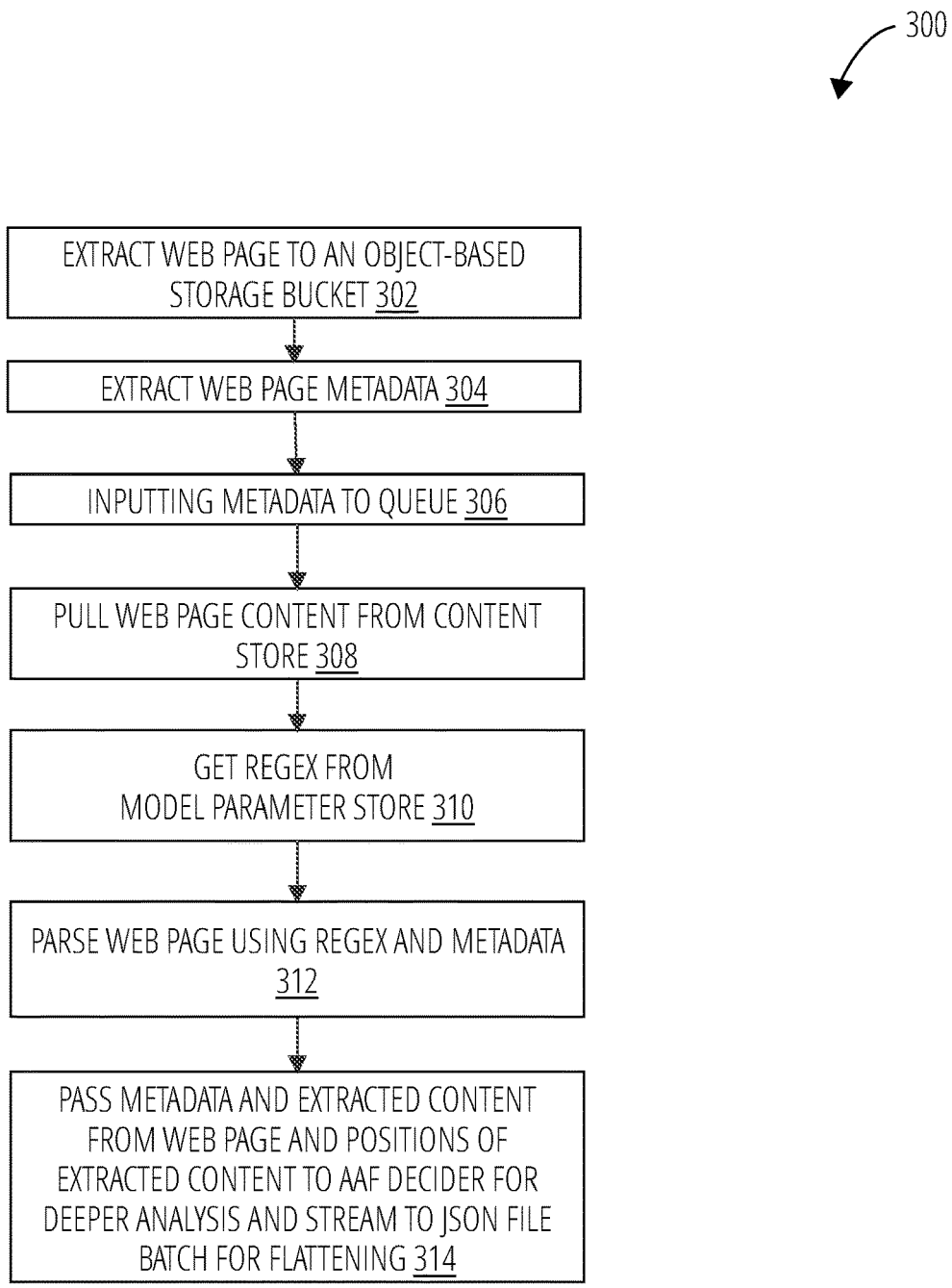
FIG. 3 illustrates a method 300 in accordance with one embodiment.

FIG. 3 illustrates a method 300 of operating a self-orchestrated system for extraction, analysis, and presentation of entity data in accordance with one embodiment. In block 302, the method 300 extracts a web page to an object-based storage bucket. In block 304, the method 300 extracts web page metadata. In block 306, the method 300 inputs metadata to queue. In block 308, the method 300 pulls web page content from content store. In block 310, the method 300 gets RegEx from model parameter store. In block 312, the method 300 parses the web page using RegEx and metadata. In block 314, the method 300 passes metadata and extracted content from web page and positions of extracted content to an AAF Decider for deeper analysis and then to stream to a JSON file batch for flattening.

Figure 4:
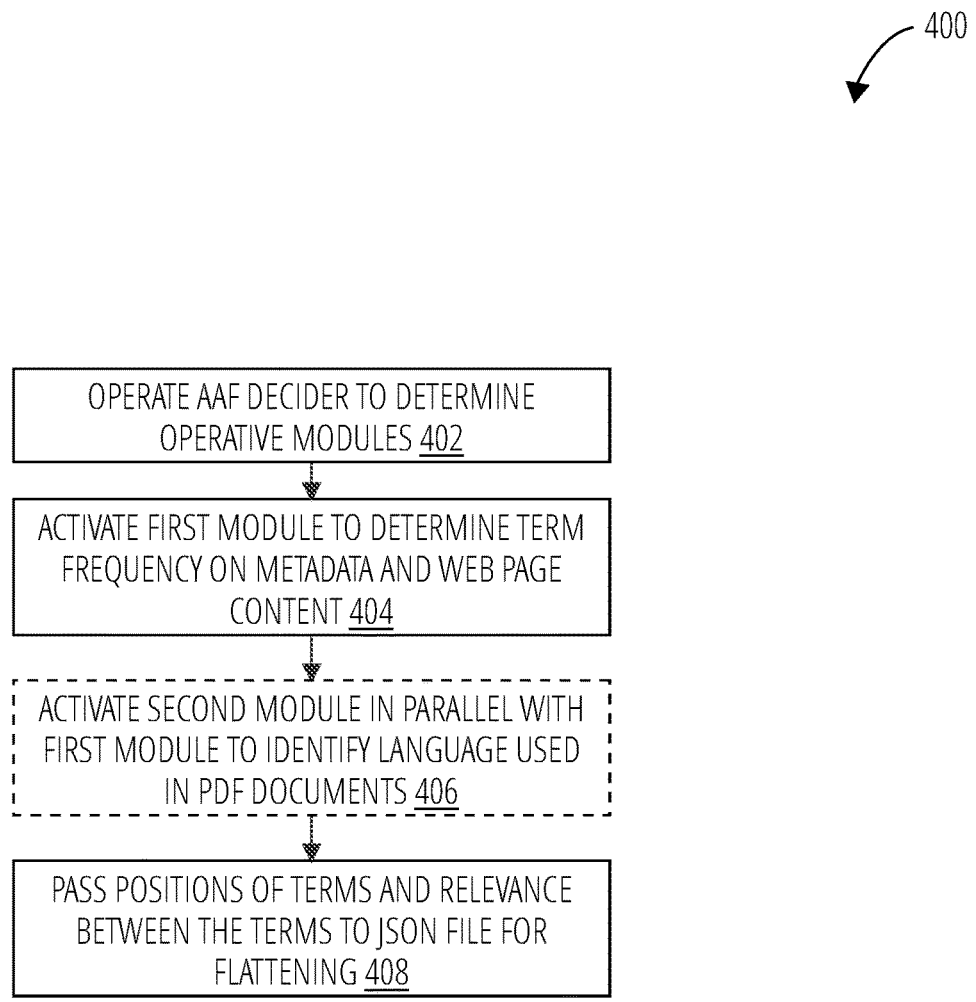
FIG. 4 illustrates a method 400 in accordance with one embodiment.

FIG. 4 illustrates a method 400 for operating an AAF decider of the self-orchestrated system for extraction, analysis, and presentation of entity data, in accordance with one embodiment. In block 402, method 400 operates an AAF Decider to determine operative modules. In block 404, method 400 activates a first module to determine term frequency on metadata and web page content. In block 406, method 400 activates a second module in parallel with first module to identify language used in PDF documents. In block 408, method 400 passes positions of terms and relevance of terms to a JSON file for flattening.

Figure 5:
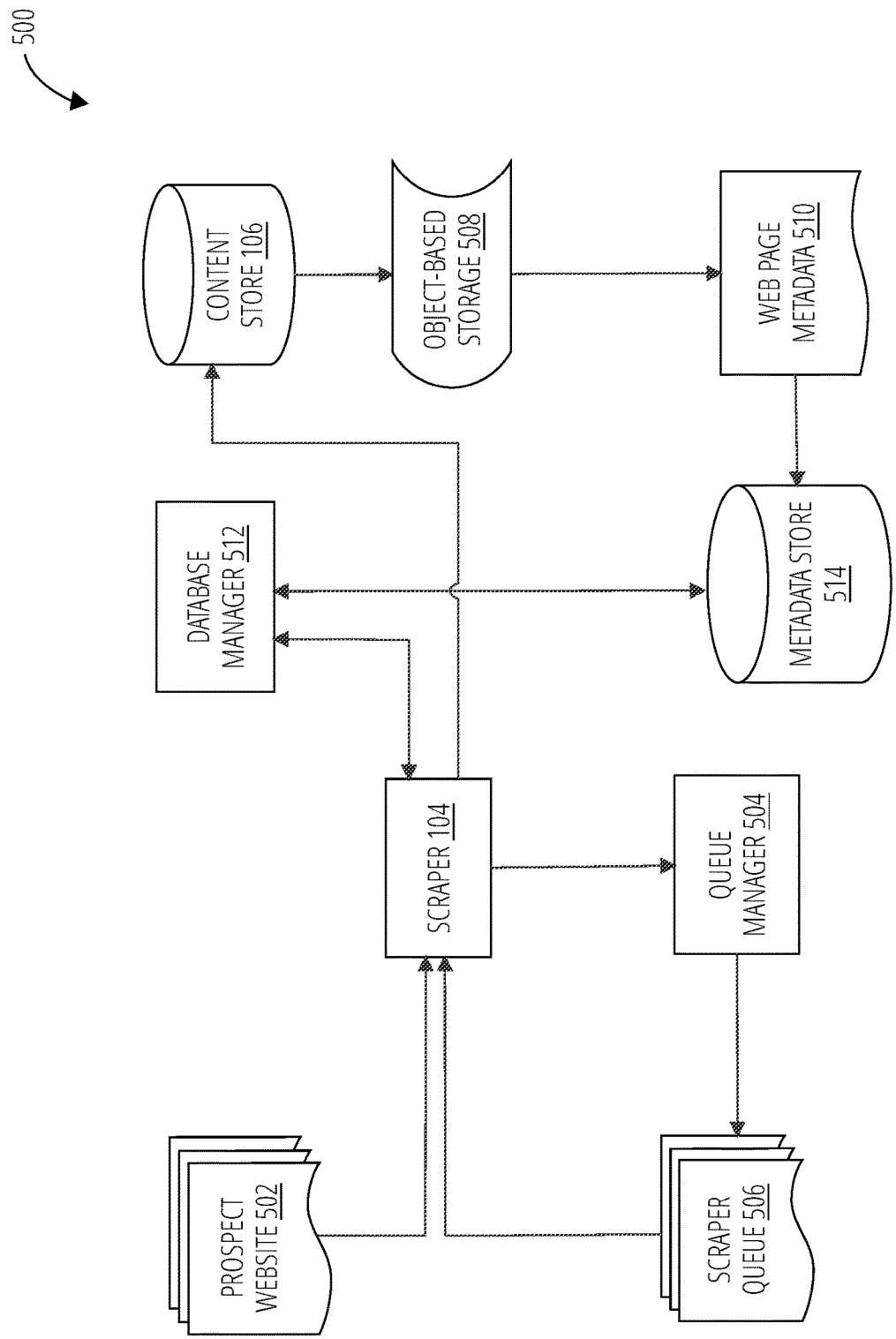
FIG. 5 illustrates a scraper system 500 in accordance with one embodiment.

FIG. 5 illustrates a scraper system 500 of the self-orchestrated system for extraction, analysis, and presentation of entity data. The scraper system 500 comprises a scraper 104, a scraper queue manager 504, a scraper queue 506, and a database manager 512. A universal resource locator (URL) from a prospect website 502 is entered into a scraper queue 506 by the queue manager 504. The scraper 104 invokes the URL to identify other URLs, web page content, and web page metadata on the prospect website 502. The scraper 104 stores data from the prospect website 502 to object-based storage 508 in the content store 106. The data stored within the object-based storage 508 may include web page content, web page metadata and a globally unique identifier. The web page metadata 510 may then also be stored in a metadata store 514 that provides the web page metadata 510 to the database manager 512. The other URLs that were extracted by the scraper may also be fed back into the queue manager 504 to populate the scraper queue 506.

The scraper is given prospective websites to scrape via a scraper queue that is controlled through a queue manager. A URL may be given to the queue manager, which adds it to the queue to invoke the scraper. The scraper downloads the entirety of the content of a site and saves that data into an object-based file store. The scraper writes the web page metadata, which is passed onto to another module to be stored in a metadata store. The queue manager may be utilized to manage the queue from adding duplicates to the scraper queue.

The scraper has parsing elements within it that that parses the web pages to find any additional URLs, while discovering PDFs, images, and other content. Any additional URLs that are found are added to the queue, so that they may be further be scraped. Content files such as PDFs are downloaded and saved into the content store 106. The metadata for the stored content is written to a metadata store 514 for the page to help track the status and location of the stored files, the quantity of links that were found on the particular page, the number of images on the web page, and any additional information regarding the aggregation of information from that page.

The queue manager may be configured to follow URLs pulled from a webpage as long as those links are within the same domain. The scraper may be configured to follow links based on a certain depth from the originating page, such as the URL may travel two links down from the originating page. The additional URLs may be useful in identifying other links such as the referenced files and downloadable content.

Figure 6:
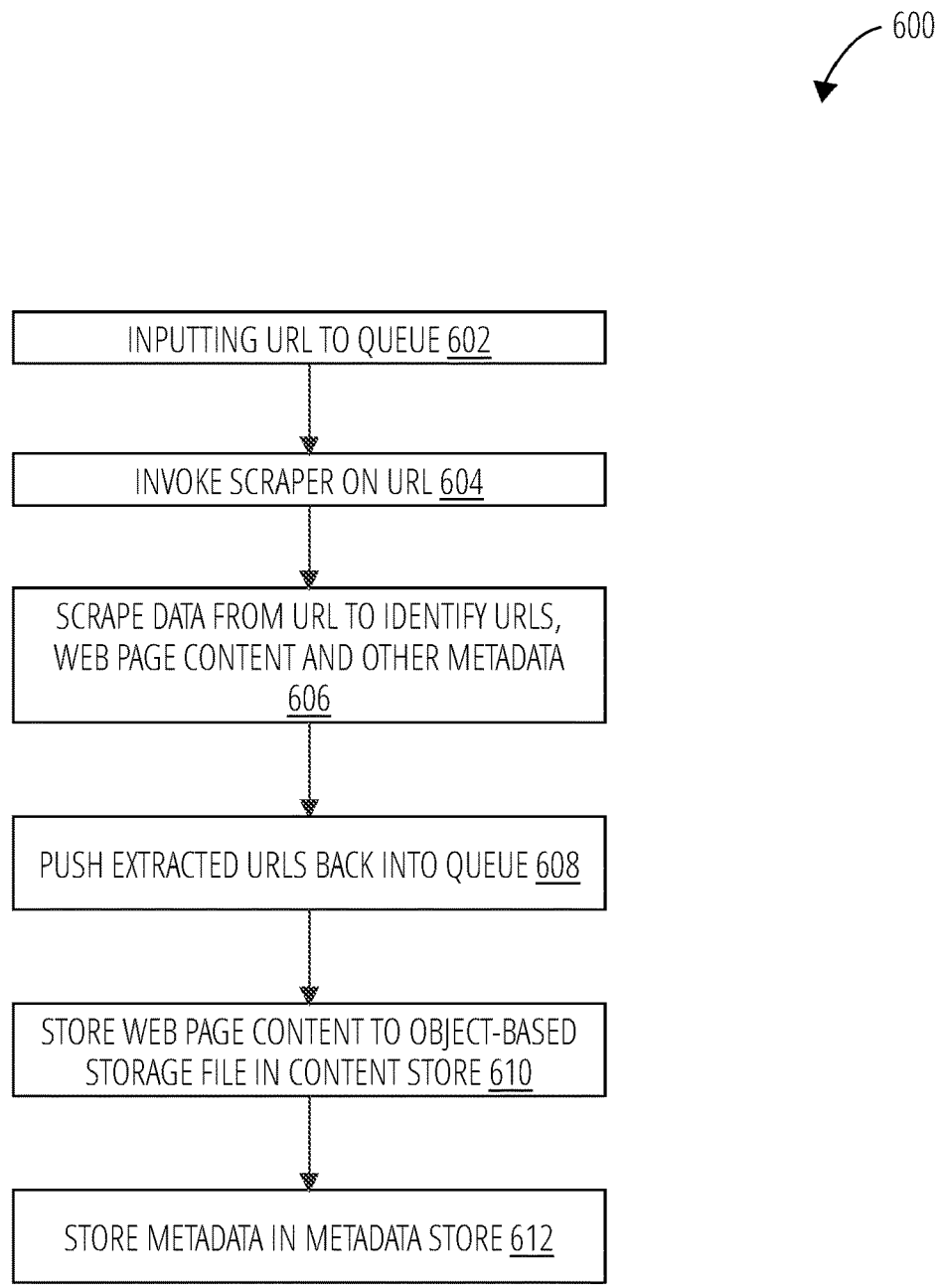
FIG. 6 illustrates a method 600 in accordance with one embodiment.

FIG. 6 illustrates a method 600 for operating a scraper of the self-orchestrated system for extraction, analysis, and presentation of entity data, in accordance with one embodiment. In block 602, the method 600 inputs a URL to queue. In block 604, the method 600 invokes a scraper on the URL. In block 606, the method 600 scrapes data from the URL to identify URLs, web page content, and other metadata. In block 610, the method 600 stores web page content to an object-based storage file in a content store. In block 612, the method 600 stores metadata in a metadata store.

Figure 7:
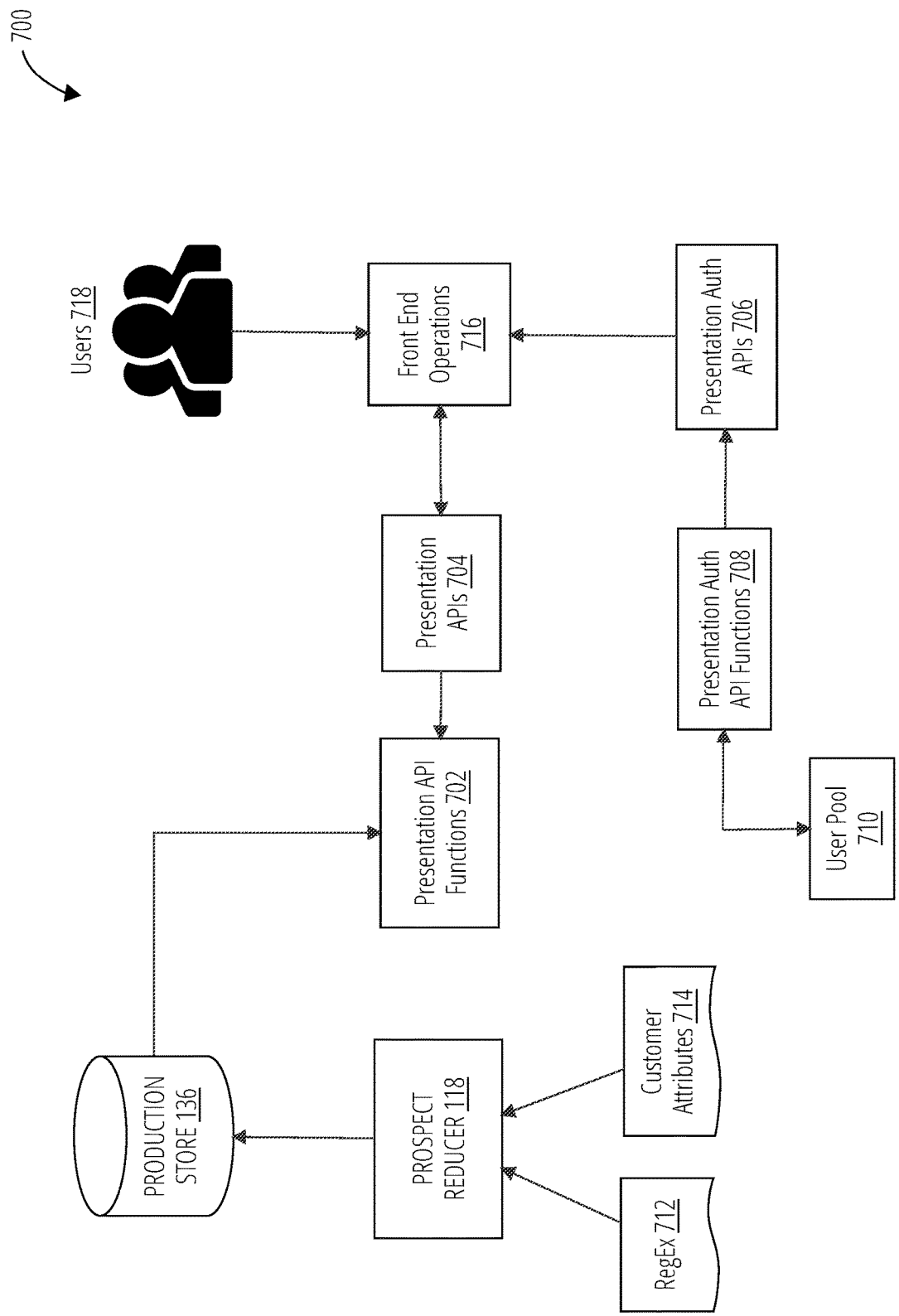
FIG. 7 illustrates a presentation system 700 in accordance with one embodiment.

FIG. 7 illustrates a presentation system 700 of the self-orchestrated system for extraction, analysis, and presentation of entity data, in accordance with one embodiment. The presentation system 700 comprises a presentation API functions 702, a presentation APIs 704, front end operations 716, presentation authentication APIs 706, presentation authentication API Functions 708, and a user pool 710. The prospect reducer 118 receives RegEx 712 and customer attributes 714 to reduce the flattened data from the production store 136 and identify customer-relevant data within SQL tables and the SQL fields using RegEx and customer attributes. Once the customer-relevant data is extracted, the information is written to the production store 136. From the production store 136, the data is communicated to the presentation API functions 702, which communicates with a presentation APIs 704 that communicates with the front end operations 716 accessible by users 718. To view the presented data, the users 718 need to be within a user pool 710 and their credentials verified through the presentation authentication API Functions 708 and presentation authentication APIs 706 before having access to the front end operations 716.

Front end operations 716 may include the presentation through the web browser of the collected and reduced data. Configurations may vary depending on client needs and priorities. Some metadata may be displayed and some may not be depending on permissions for user groups etc.

Figure 8:
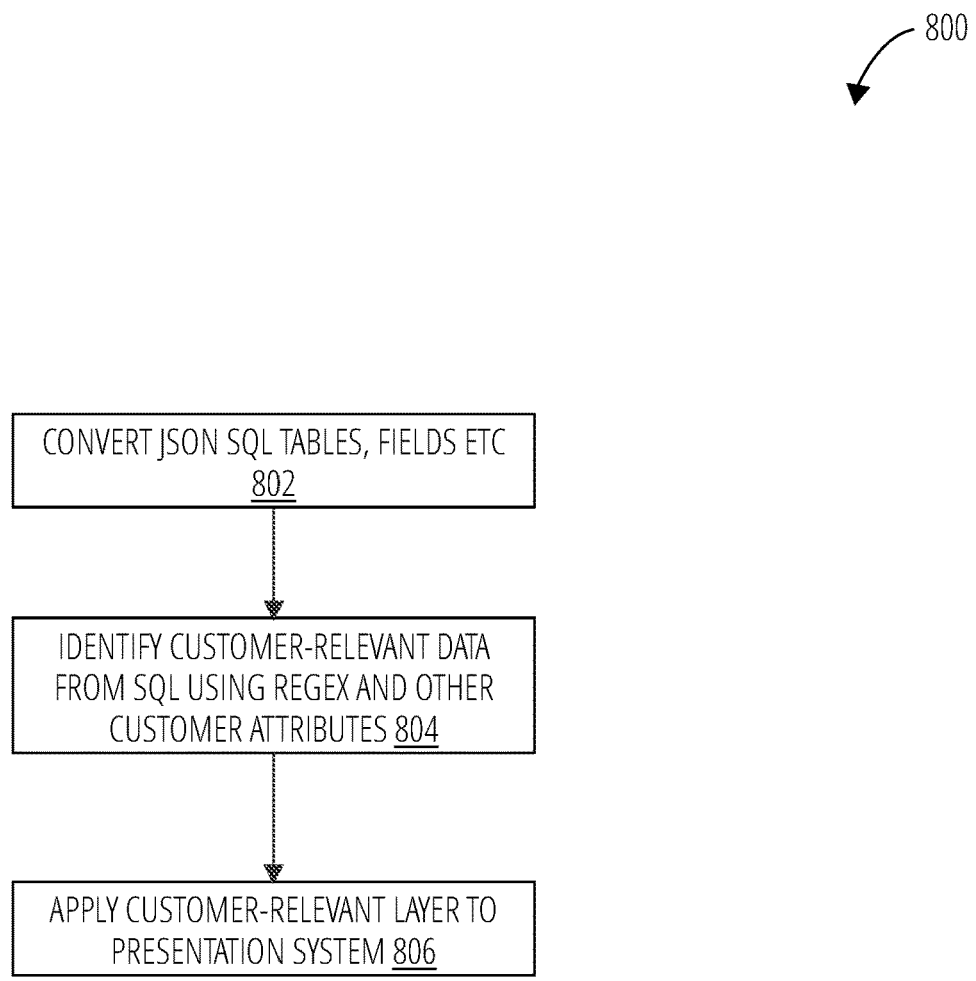
FIG. 8 illustrates a method 800 in accordance with one embodiment.

FIG. 8 illustrates a method 800 for operating the presentation system of the self-orchestrated system for extraction, analysis, and presentation of entity data, in accordance with one embodiment. In block 802, the method 800 converts JSON SQL tables, fields, etc. In block 804, the method 800 identifies customer-relevant data from SQL using RegEx and other customer attributes. In block 806, the method 800 applies a customer-relevant layer to presentation system.

Related to customer-relevant data, customers may be interested in specific subsets of collected data and metadata. For example, one customer may need geography/location data for businesses and contacts, and another may need only email addresses and phone numbers. Other customers may need additionally reduced metadata like certifications identified, product offerings, or specifics like supply chain resources (e.g., pipe material, pipe diameter, etc.).

Figure 9:
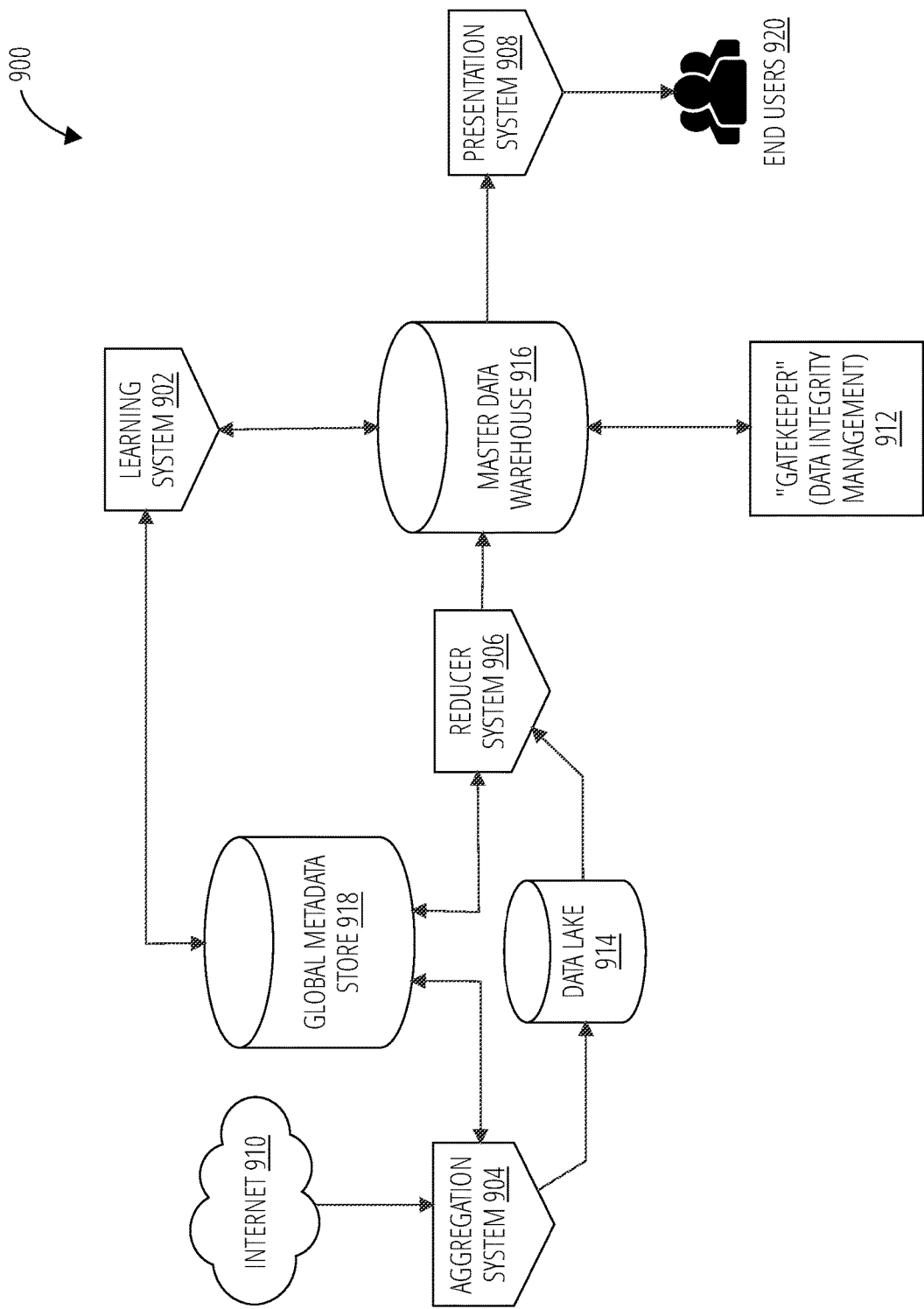
FIG. 9 illustrates a system 900 in accordance with one embodiment.

FIG. 9 illustrates a self-orchestrated system 900 for extraction, analysis, and presentation of entity data in accordance with one embodiment. The system 900 comprises an aggregation system 904, a reducer system 906, a learning system 902, and a presentation system 908. The aggregation system 904 collects data from web pages through the internet 910. The extracted data is then stored in a data lake 914 while the metadata for the extracted data is stored in a global metadata store 918. A reducer system 906 reduces the extracted data from the data lake 914 utilizing at least the metadata from the global metadata store 918 before passing the reduced data to the master data warehouse 916. The reduced data is then provided to a presentation system 908 which formats and presents the data to a group of end users 920. During this process, a gatekeeper 912 ensures that reduced data is flattened to limit duplicates while a learning system 902 provides feedback to the global metadata store 918 to assist in tuning the aggregation system 904 and the reducer system 906.

The system provides improved search features by being able to combine frequency analysis with proximity analysis to improve the relevance of scored term.

For example, if a specific keyword is repeatedly found at particular location on a web page, based on the document object model (DOM) that structures the layout of a page, it is possible to know what the keyword is adjacent to as well as if it is the parent of a specific kind of element on the page.

Based on this organization the system may be able to identify proximity. Since the DOM model has a tree like organization, where the elements are nested and branch out from a root location, when a keyword (term) is identified, a search can be performed that identify neighbors, parents, and children elements near the keyword.

This allows the building of a distance relationship between terms that can determine how closer far two elements are in that relationship.

The distance measurement may then be utilized as part of a filter function to decide what around the keyword should be analyzed further. For example, if the system finds a phone number, somewhere on the page, it's likely that near that phone number, the system may find an address, or some other contact information. The system may flag those results based on the possible relationship to look for additional elements within that proximity value. From those results, an additional analysis may be performed to other specific keywords. The additional analysis may also be performed at a later time to reduce the load of the system.

Another aspect of the system is the utilization of the DOM to look for relationships between different element types. For instance, after running natural language process a block of text of interest is found, the system may utilize a technique similar to computer vision functions to perform edge detection and parse the website. By doing so the system may be able to use the relationship between the different elements to understand the topographic nature of the block of text and its positional relationship on different pages.

The positioning of the keyword could be distant in terms of actual spacing on the page, but closely related based on the DOM structure. In the DOM structure, the distance may be based on the levels of separation between the elements, or another dimension of the DOM structure. For example the dimensionality be based on how many edges need to be traversed to get from one keyword of interest to another. Another type of dimensionality may be hierarchy, which may be how many levels are traversed between keywords. With those dimensions, the function may have two levels of dimensionality to process. However, these dimensional restrictions can be made flexible as the parent child relationships within a DOM. Another aspect of the system relating to the DOM is that nature of neighbors can be more relevant than the parent child relationship positioning of terms.

In the DOM structure distance plays key role in the identification of areas for additional analysis. For instance, if the exact keyword is found across every footer and every header across 10,000 pages, it would be clear that the element is not of high value. Therefore, the system can be configured to remove duplicates.

The term frequency function may be based on a term frequency inverse density function, TF IDF. In this function, the body of content may be feed through the algorithm to determine the frequency of specific terms within the content.

The term frequency system helps feed the search ability and the manner in which the system filters and manipulates different end results. This allows for the categorization of different sites, in order to find different prospects. For instance, when a URL is given the frequency system can partially identify what is on the URL based on the key terms on the site and from there narrow down what the purpose of the site actually does without visiting the sites. The kind of distance system is more for feeding the actual data views for targeted information that can be shown to end users.

Figure 10:
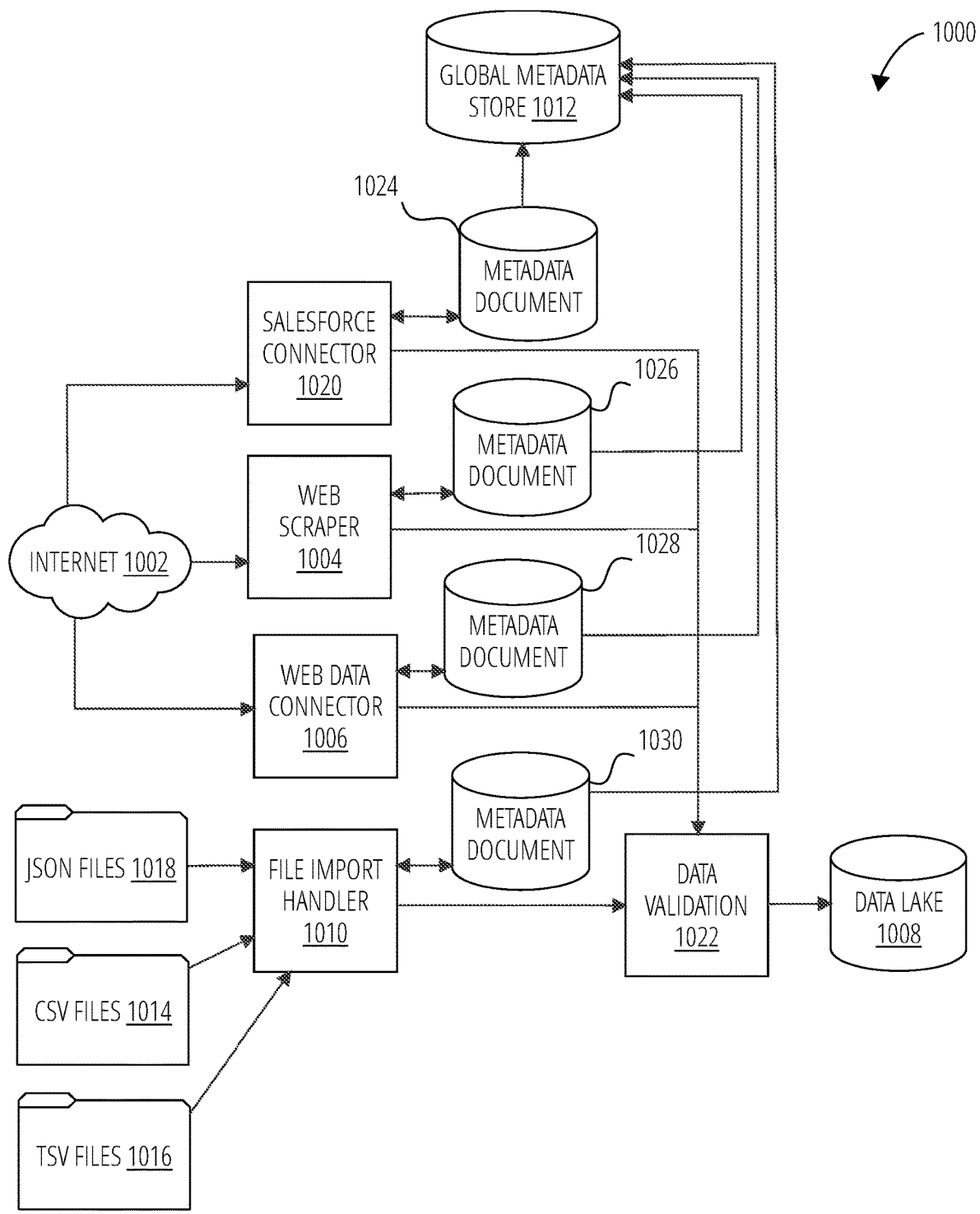
FIG. 10 illustrates an aggregation system 1000 in accordance with one embodiment.

FIG. 10 illustrates an aggregation system 1000 of the self-orchestrated system for extraction, analysis, and presentation of entity data, in accordance with one embodiment. The data aggregation system is a layer class of components that interface with any data coming from outside the data system. Examples of this include the importing of CSVs, crawling & scraping websites, and pulling or polling for API data. The aggregation system 1000 comprises a salesforce connector 1020, a web scraper 1004, a web data connector 1006, and a file import handler 1010. The salesforce connector 1020, the web scraper 1004, and the web data connector 1006 pull data from the internet 1002. The salesforce connector 1020 communicates with a metadata document 1024. The web scraper 1004 communicates with a metadata document 1026. The web data connector 1006 communicates with a metadata document 1028. The data from salesforce connector 1020, the web scraper 1004, and the web data connector 1006 undergo a data validation 1022 process before the data is stored in a data lake 1008. The file import handler 1010 pulls in data from various file types that include JSON files 1018, CSV files 1014, and TSV files 1016. Data pulled by the file import handler 1010 also undergo a data validation 1022 before it is stored in the data lake 1008. The data stored in the metadata document 1024, the metadata document 1026, the metadata document 1028, and the metadata document 1030 is communicated to the global metadata store 1012.

Figure 11:
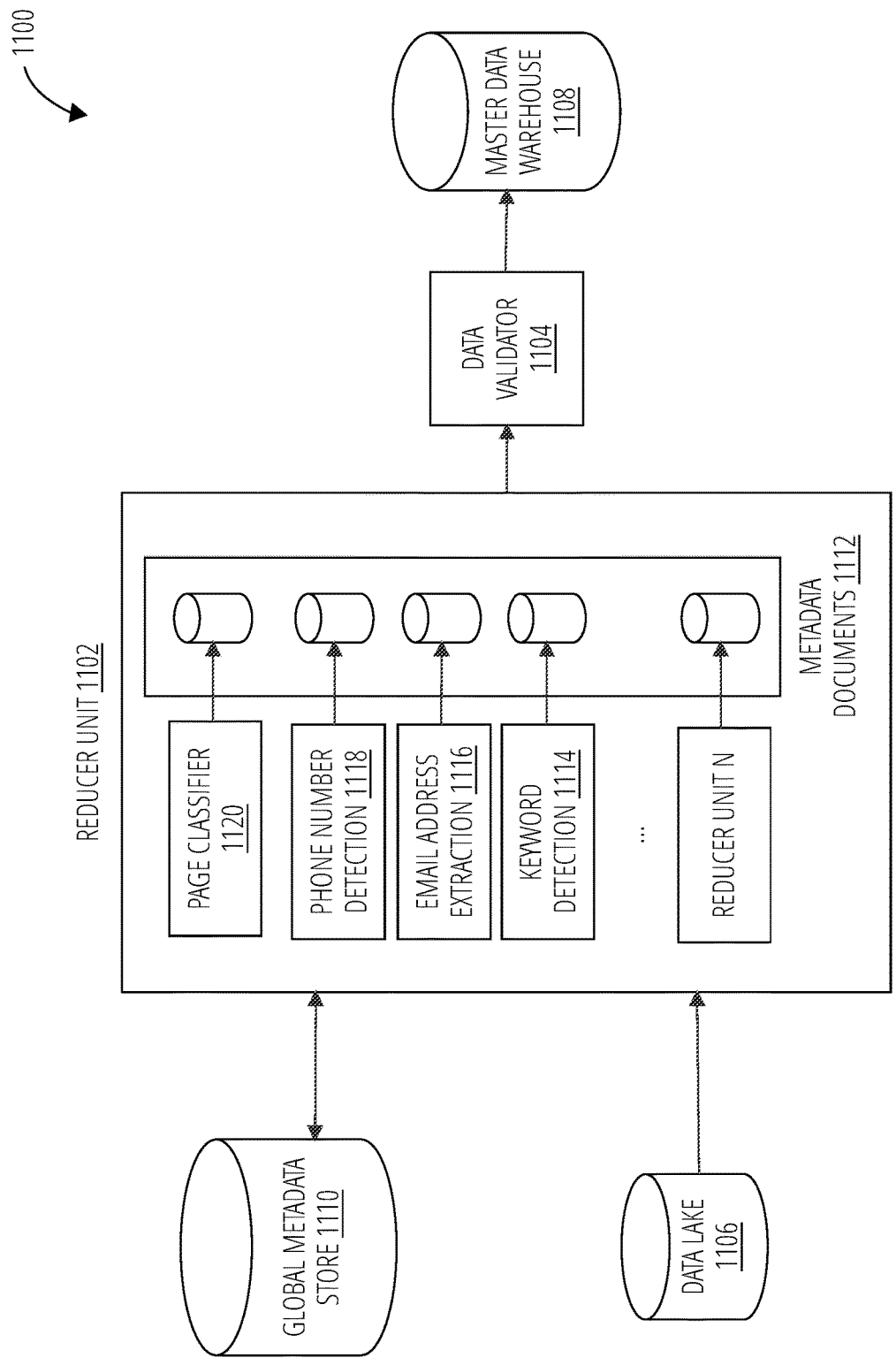
FIG. 11 illustrates a reducer system 1100 in accordance with one embodiment.

FIG. 11 illustrates a reducer system 1100 of the self-orchestrated system for extraction, analysis, and presentation of entity data, in accordance with one embodiment. The reducer system 1100 includes a reducer unit 1102, a global metadata store 1110, a data lake 1106, a data validator 1104, and a master data warehouse 1108. The reducer unit 1102 receives information from the global metadata store 1110 and the data lake 1106. The reducer unit 1102 comprising a plurality of modules that may include a page classifier module 1120, a phone number detection module 1118, an email address extraction module 1116, and a keyword detection module 1114 that stores reduced data to metadata documents 1112. The reduced data in the metadata documents 1112 is validated through a data validator 1104 before it is stored in a master data warehouse 1108.

Figure 12:
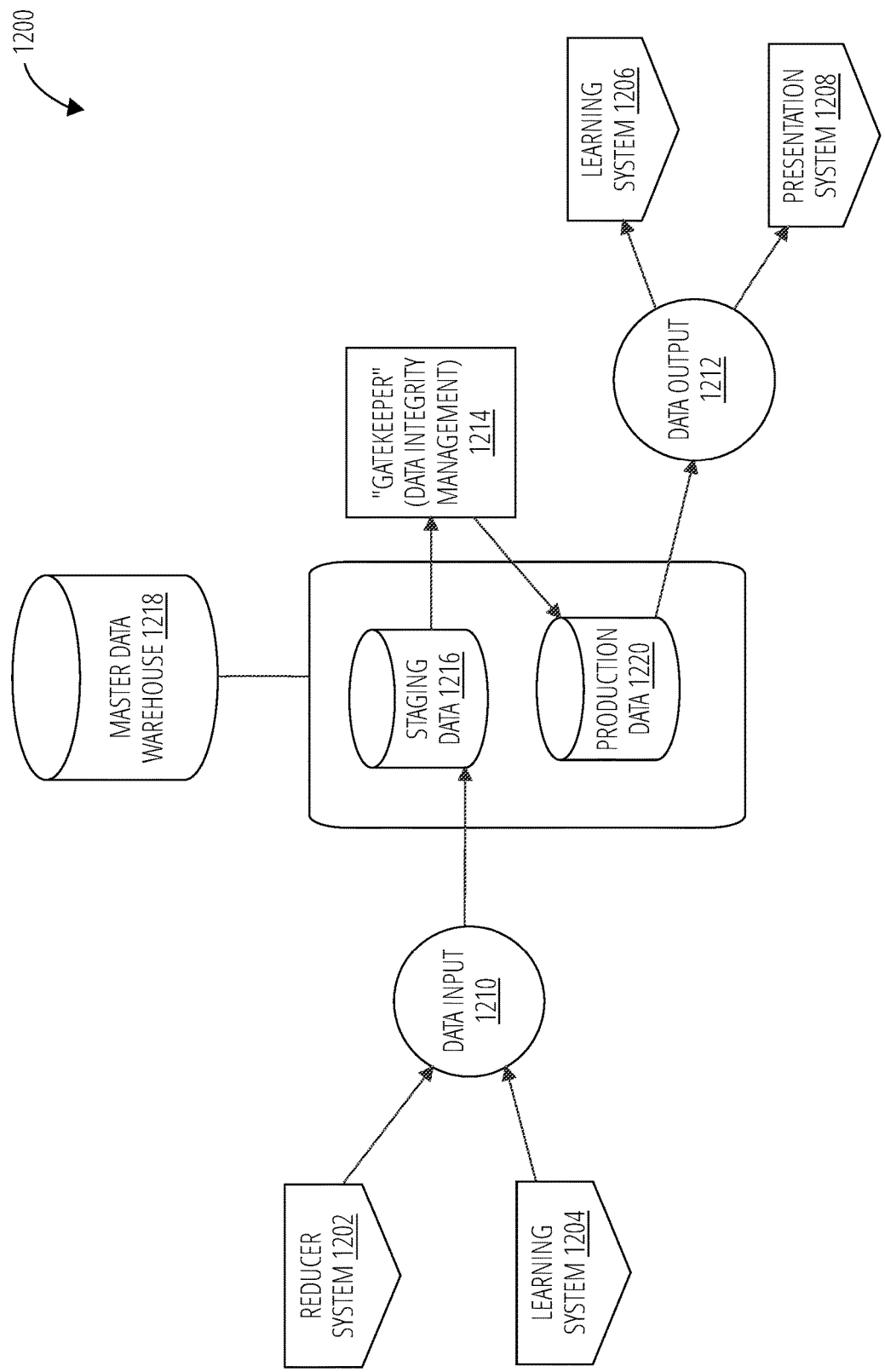
FIG. 12 illustrates a system 1200 in accordance with one embodiment.

FIG. 12 illustrates a self-orchestrated system 1200 for extraction, analysis, and presentation of entity data, in accordance with one embodiment. In the system 1200, data input 1210 receives data from a reducer system 1202 and a learning system 1204. The received data is sent to a master data warehouse 1218 where it is stored as staging data 1216. The staging data 1216 is managed by a gatekeeper 1214 that performs data integrity management before the it is stored as production data 1220 in the master data warehouse 1218. The production data is then sent as a data output 1212 to the learning system 1206 and the presentation system 1208.

Figure 13:
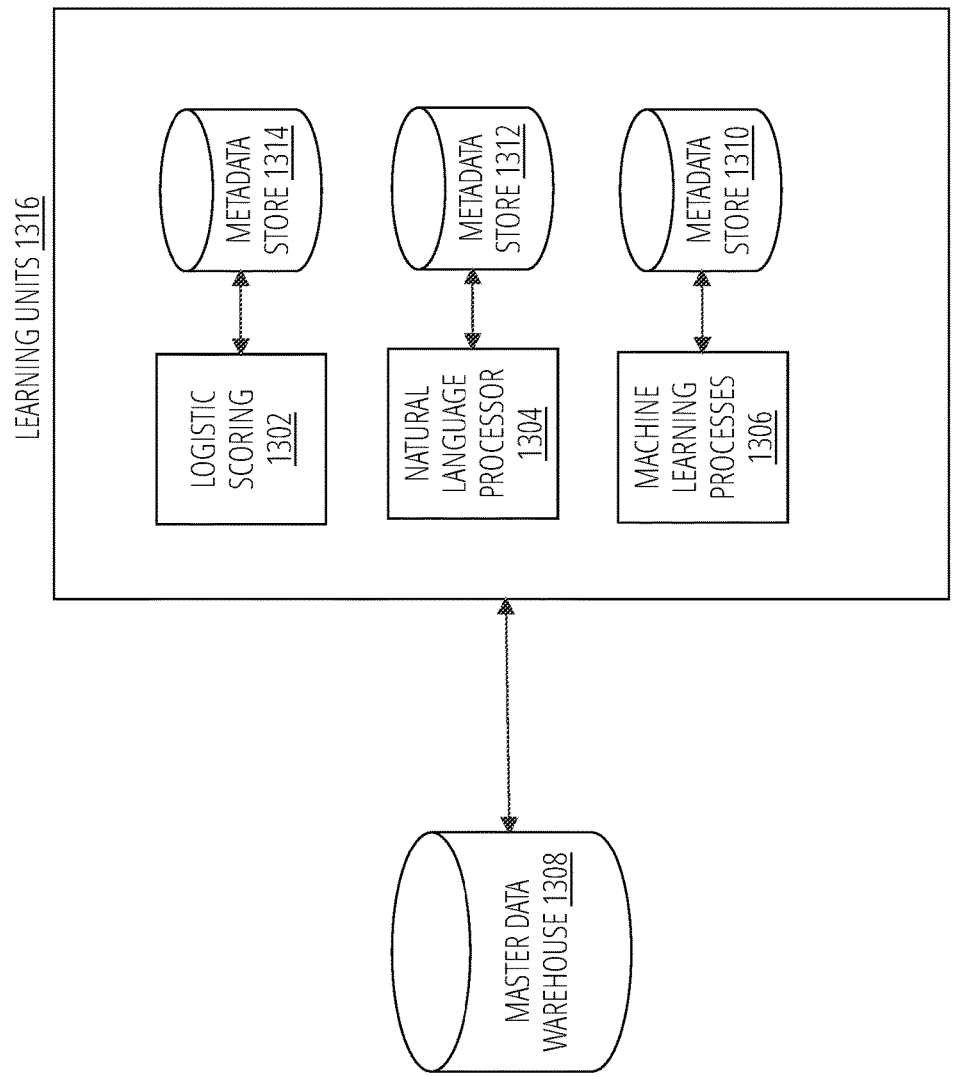
FIG. 13 illustrates a learning system 1300 in accordance with one embodiment.

FIG. 13 illustrates a learning system 1300 of the self-orchestrated system for extraction, analysis, and presentation of entity data, in accordance with one embodiment. The learning system 1300 comprises learning units 1316 that perform operations associated with scoring, processing, and machine learning to improve operations of the system. The learning units 1316 may comprise a logistic scoring module 1302, a natural language processor 1304, and a machine learning processes 1306 that operate on data from a master data warehouse 1308. The logistic scoring module 1302 may communicate its results with a metadata store 1314. The natural language processor 1304 may communicate its results with a metadata store 1312. The machine learning processes 1306 may communicate its results with the metadata store 1310.

Figure 14:
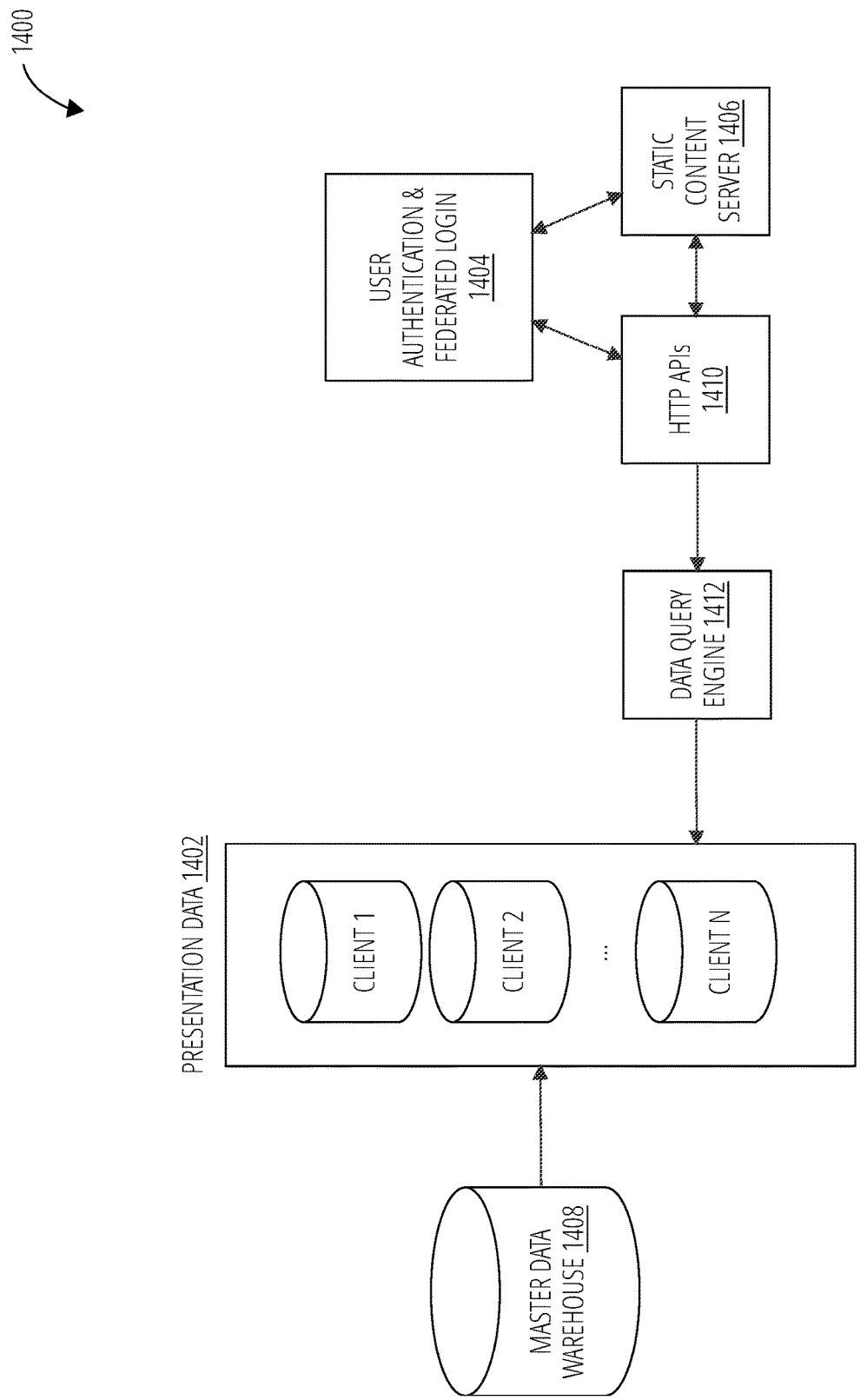
FIG. 14 illustrates a presentation system 1400 in accordance with one embodiment.

FIG. 14 illustrates a presentation system 1400 of the self-orchestrated system for extraction, analysis, and presentation of entity data, in accordance with one embodiment. In the presentation system 1400, the presentation data 1402 is stored in the master data warehouse 1408 and may be accessible by users that have undergone user authentication & federated login 1404. The user authentication & federated login 1404 may communicate with a static content server 1406 and an HTTP APIs 1410 before allowing users access to the presentation data 1402 through a data query engine 1412. This layer of security may be useful to limit access to the client data within the presentation data 1402 to authorized users.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

The methods and system in this disclosure are described in the preceding on the basis of several preferred embodiments. Different aspects of different variants are considered to be described in combination with each other such that all combinations, upon reading by a skilled person in the field on the basis of this document, may be regarded as being read within the concept of the disclosure. The preferred embodiments do not limit the extent of protection of this document.

Having thus described embodiments of the present disclosure of the present application in detail and by reference to illustrative embodiments thereof, it will be apparent that modifications and variations are possible without departing from the scope of the present disclosure.

What is claimed is:

1. A method for operating a self-orchestrated system for extraction, analysis, and presentation of entity data, the method comprising:
   extracting a web page to a content store comprising object-based storage including web page content, web page metadata and a globally unique identifier;
   extracting the web page metadata from the object-based storage;
   inputting the web page metadata to a queue;
   pulling web page content from the content store;
   receiving RegEx from a model parameter store;
   parsing the web page content using RegEx and the web page metadata from the queue to generate extracted content and positions of extracted content;
   passing the web page metadata, the extracted content, and the positions of extracted content to an advanced analysis function decider (AAF Decider) for analysis to generate relevance between the terms;
   streaming the relevance between the terms and the positions of extracted content to a JSON file batch for flattening;
   converting the JSON files to SQL tables and SQL fields;
   identifying customer-relevant data from the SQL tables and the SQL fields using RegEx and customer attributes; and
   applying the customer-relevant data to a presentation system.

2. The method of claim 1 further comprising:
   the AAF Decider further comprising logic to:
     determine presence of a term at a web page location;
     determine proximity of terms based on a document object model (DOM) including levels;
     determine a distance between terms in order to filter for a relevance between the terms;
     apply DOM levels and a nature of edge factor into the distance and the relevance determinations;
     apply a term frequency Inverse Density Function;
     apply term frequency to drive categorization of a web site and the distance between the terms to drive presentation and relevance; and
     perform language analysis to identify at least one of vernacular, industry-specific terminology, and dictionaries.

3. The method of claim 1, further comprising:
   operating the AAF Decider to determine operative modules;
   activating a first module to determine term frequency on the web page metadata and the web page content;
   activating a second module in parallel with the first module to identify language used in the web page content; and
   passing positions of terms and relevance between the terms to the JSON file for flattening.

4. The method of claim 1, wherein the web page content is at least one PDF document from the web page.

5. The method of claim 1, further comprising:
   inputting a universal resource locator (URL) to a scraper queue;
   invoking a scraper on the URL;
   scraping data from the URL to identify other URLs, web page content, and web page metadata;
   pushing the identified other URLs to the scraper queue;
   storing the web page content to the object-based storage; and
   storing the web page metadata to a metadata store.

6. The method of claim 1, further comprising:
   inputting a universal resource locator (URL) to a scraper queue;
   invoking a scraper on the URL;
   scraping data from the URL to identify other URLs, web page content, and web page metadata;
   pushing the identified other URLs to the scraper queue;
   storing the web page content to the object-based storage; and
   storing the web page metadata to a metadata store.

7. A non-transitory computer-readable storage medium, the computer-readable storage medium including instructions that when executed by a computer, cause the computer to:
   extract a web page to a content store comprising object-based storage including web page content, web page metadata and a globally unique identifier;
   extract the web page metadata from the object-based storage;
   input the web page metadata to a queue;
   pull web page content from the content store;
   receive RegEx from a model parameter store;
   parse the web page content using RegEx and the web page metadata from the queue to generate extracted content and positions of extracted content;
   pass the web page metadata, the extracted content, and the positions of extracted content to an advanced analysis function decider (AAF Decider) for analysis to generate relevance between the terms;
   stream the relevance between the terms and the positions of extracted content to a JSON file batch for flattening;
   convert the JSON files to SQL tables and SQL fields;
   identify customer-relevant data from the SQL tables and the SQL fields using RegEx and customer attributes; and
   apply the customer-relevant data to a presentation system.

8. The computer-readable storage medium of claim 7 wherein the instructions further configure the computer to:
   the AAF Decider further comprising logic to:
     determine presence of a term at a web page location;
     determine proximity of terms based on a document object model (DOM) including levels;
     determine a distance between terms in order to filter for a relevance between the terms;
     apply DOM levels and a nature of edge factor into the distance and the relevance determinations;
     apply a term frequency Inverse Density Function;
     apply term frequency to drive categorization of a web site and the distance between the terms to drive presentation and relevance; and
     perform language analysis to identify at least one of vernacular, industry-specific terminology, and dictionaries.

9. The computer-readable storage medium of claim 7, wherein the instructions further configure the computer to:
   operate the AAF Decider to determine operative modules;
   activate a first module to determine term frequency on the web page metadata and the web page content;
   activate a second module in parallel with the first module to identify language used in the web page content; and pass positions of terms and relevance between the terms to the JSON file for flattening.

10. The computer-readable storage medium of claim 7, wherein the web page content is at least one PDF document from the web page.

11. The computer-readable storage medium of claim 7, wherein the instructions further configure the computer to:
input a universal resource locator (URL) to a scraper queue;
invoke a scraper on the URL;
scrape data from the URL to identify other URLs, web page content, and web page metadata;
push the identified other URLs to the scraper queue;
store the web page content to the object-based storage; and
store the web page metadata to a metadata store.

12. A computing apparatus, the computing apparatus comprising:
a processor; and
a memory storing instructions that, when executed by the processor, configure the apparatus to:
extract a web page to a content store comprising object-based storage including web page content, web page metadata and a globally unique identifier;
extract the web page metadata from the object-based storage;
input the web page metadata to a queue;
pull web page content from the content store;
receive RegEx from a model parameter store;
parse the web page content using RegEx and the web page metadata from the queue to generate extracted content and positions of extracted content;
pass the web page metadata, the extracted content, and the positions of extracted content to an advanced analysis function decider (AAF Decider) for analysis to generate relevance between the terms, the AAF Decider further comprising logic to:
determine presence of a term at a web page location;
determine proximity of terms based on a document object model (DOM) including levels;
determine a distance between terms in order to filter for a relevance between the terms;
apply DOM levels and a nature of edge factor into the distance and the relevance determinations;
apply a term frequency Inverse Density Function;
apply term frequency to drive categorization of a web site and the distance between the terms to drive presentation and relevance; and
perform language analysis to identify at least one of vernacular, industry-specific terminology, and dictionaries; and
stream the relevance between the terms and the positions of extracted content to a JSON file batch for flattening.

13. The computing apparatus of claim 12, wherein the instructions further configure the apparatus to:
operate the AAF Decider to determine operative modules;
activate a first module to determine term frequency on the web page metadata and the web page content;
activate a second module in parallel with the first module to identify language used in the web page content; and
pass positions of terms and relevance between the terms to the JSON file for flattening.

14. The computing apparatus of claim 12, wherein the web page content is at least one PDF document from the web page.

15. The computing apparatus of claim 12, wherein the instructions further configure the apparatus to:
input a universal resource locator (URL) to a scraper queue;
invoke a scraper on the URL;
scrape data from the URL to identify other URLs, web page content, and web page metadata;
push the identified other URLs to the scraper queue;
store the web page content to the object-based storage; and
store the web page metadata to a metadata store.

16. The computing apparatus of claim 12, wherein the instructions further configure the apparatus to:
convert the JSON files to SQL tables and SQL fields;
identify customer-relevant data from the SQL tables and the SQL fields using RegEx and customer attributes; and
apply the customer-relevant data to a presentation system.

17. A method for operating a self-orchestrated system for extraction, analysis, and presentation of entity data, the method comprising:
extracting a web page to a content store comprising object-based storage including web page content, web page metadata and a globally unique identifier;
extracting the web page metadata from the object-based storage;
inputting the web page metadata to a queue;
pulling web page content from the content store;
receiving RegEx from a model parameter store;
parsing the web page content using RegEx and the web page metadata from the queue to generate extracted content and positions of extracted content;
passing the web page metadata, the extracted content, and the positions of extracted content to an advanced analysis function decider (AAF Decider) for analysis to generate relevance between the terms, the AFF decider further comprising logic to:
determine presence of a term at a web page location;
determine proximity of terms based on a document object model (DOM) including levels;
determine a distance between terms in order to filter for a relevance between the terms;
apply DOM levels and a nature of edge factor into the distance and the relevance determinations;
apply a term frequency Inverse Density Function;
apply term frequency to drive categorization of a web site and the distance between the terms to drive presentation and relevance; and
perform language analysis to identify at least one of vernacular, industry-specific terminology, and dictionaries; and
streaming the relevance between the terms and the positions of extracted content to a JSON file batch for flattening.

18. The method of claim 17, further comprising:
operating the AAF Decider to determine operative modules;
activating a first module to determine term frequency on the web page metadata and the web page content;
activating a second module in parallel with the first module to identify language used in the web page content; and
passing positions of terms and relevance between the terms to the JSON file for flattening.

19. The method of claim 17, wherein the web page content is at least one PDF document from the web page.

20. The method of claim 17, further comprising:

converting the JSON files to SQL tables and SQL fields;

identifying customer-relevant data from the SQL tables and the SQL fields using RegEx and customer attributes; and applying the customer-relevant data to a presentation system.

\* \* \* \* \*